United States Patent [19]

Khanarian et al.

[11] Patent Number: 5,400,172
[45] Date of Patent: Mar. 21, 1995

[54] MULTI-LAYER OPTICAL ELEMENTS FORMED FROM FREE STANDING FILMS AND METHOD OF MAKING SAME

[75] Inventors: Garo Khanarian, Union; Mohammad A. Mortazavi, Somerset, both of N.J.

[73] Assignee: Hoechst Celanese Corp., Somerville, N.J.

[21] Appl. No.: 33,714

[22] Filed: Mar. 18, 1993

[51] Int. Cl.⁶ .................................................. G02F 1/35
[52] U.S. Cl. .................................................. 359/326
[58] Field of Search .................. 385/122; 359/326–332

[56] References Cited

U.S. PATENT DOCUMENTS

| | | | |
|---|---|---|---|
| 4,865,406 | 9/1989 | Khanarian et al. | 385/122 |
| 5,002,361 | 3/1991 | DeMartino et al. | 385/122 |
| 5,039,186 | 8/1991 | Man et al. | 385/122 |
| 5,044,725 | 9/1991 | DeMartino et al. | 385/130 |
| 5,061,028 | 10/1991 | Khanarian et al. | 385/132 |
| 5,064,265 | 11/1991 | Khanarian et al. | 385/130 |
| 5,113,469 | 5/1992 | Hatakoshi et al. | 385/122 |
| 5,131,068 | 7/1992 | Khanarian et al. | 385/122 X |
| 5,155,791 | 10/1992 | Hsiung | 385/122 |
| 5,241,413 | 8/1993 | Uenishi et al. | 359/328 |
| 5,241,616 | 8/1993 | Garcia | 385/122 X |

FOREIGN PATENT DOCUMENTS 4-304434  10/1992  Japan ..................... 359/326

Primary Examiner—John D. Lee
Attorney, Agent, or Firm—Michael W. Ferrell

[57] ABSTRACT

There is disclosed and claim a multi-layer polymeric optical element including at least two poled film members exhibiting nonlinear optical susceptibility. The films may be poled in an ordinary atmosphere under relatively mild conditions, or corona poled at high voltage. The elements are particularly useful for periodic or quasi-random optical applications such as parametric amplification of light or frequency doubling.

20 Claims, 4 Drawing Sheets

MULTI-LAYER OPTICAL ELEMENTS FORMED FROM FREE STANDING FILMS AND METHOD OF MAKING SAME

TECHNICAL FIELD

The present invention relates generally to nonlinear optical devices and more particularly to such devices made of polymeric material by way of (a) preparing at least two poled polymer film elements; and (b) laminating said film elements together to define a composite structure. Devices in accordance with the present invention are especially useful in connection with quasi-phase matching second harmonic generation and other parametric optical processes.

BACKGROUND

Polymer nonlinear optical materials have been studied at length, especially their use in connection with second order nonlinear optical processes. Typical materials of interest include polymers with an acrylate backbone and sidechain chromophores of the congregated aromatic class for example, as are taught in U.S. Pat. Nos.: 5,044,725; 4,822,865; and 4,801,670. Such polymers may be incorporated into high speed waveguiding modulators, for example, as shown by Teng applied physics letters 60 (13), Mar. 30, 1992, or in parametric devices including frequency doublers as disclosed in U.S. Pat. Nos.: 4,865,406; 4,971,416 and 5,061,028. Generally speaking, nonlinear optical polymer material is poled in an electrical field when used in a second order nonlinear optical device so that the required non-centrosymmetric molecular orientation is achieved. Poling maybe accomplished by a variety of methods, for example, by applying an electric field to a film between electrodes at elevated temperatures or by way of corona poling as reported by Mortazayi et al. *Journal of the Optical Society Am.B*/Vol. 6, No. 4/April, 1989, pp. 733–741. Typically, poled films of the foregoing class exhibit a positive $\beta$ value; however, some material such as the quinodimethane compounds exhibit negative $\beta$ values. See e.g. U.S. Pat. Nos.: 4,783,151 and 4,719,281. Of particular interest to the present invention is harmonic processes in polymer nonlinear optical materials. In this respect, pertinent literature includes: Nazarathy M. et al. "SPREAD-SPECTRUM NONLINEAR-OPTICAL INTERACTIONS QUASI-PHASE MATCHING WITH PSEUDORANDOM POLARITY REVERSALS", *Optics Letters* Vol 12,. No. 10, p. 823 et seq. October, 1987; Singer K. D. et. al. "SECOND HARMONIC GENERATION IN POLED POLYMERS FILMS" *Applied Physics Letters*, 49 (5), p. 248 et seq. Aug. 4, 1986; Azumai, Y. et al., "EFFICIENT SECOND-HARMONIC GENERATION WITH A SLAB WAVEGUIDE COMPOSED OF PERIODICALLY CORONA-POLED ORGANIC COPOLYMER", *Japan Journal of Applied Physics*, Vol. 31, (1992)pp. 1358–1364, Part I, No. 5A, May 1992; Magel, G. A. et al., "QUASI-PHASE-MATCHED SECOND-HARMONIC GENERATION OF BLUE LIGHT IN PERIODICALLY POLED LiNbO$_3$, *Applied Physics Letters*, 56 (2), Jan. 8, 1990, pp. 108–110; Mortazyi, M. A. et al., "HARMONIC GENERATION WITH ULTRASHORT PULSES USING NONLINEAR POLED POLYMERIC THIN FILMS", *Applied Optics*, Vol. 28, No. 15, Aug. 15, 1989, pp. 3278–3280; Khanarian. G. et al., "QUASI-PHASE-MATCHED FREQUENCY DOUBLING OVER 5 mm IN PERIODICALLY POLED POLYMER WAVEGUIDE", *Electronics Letters* 26, pp. 2105 et seq., 1990; Bierlein , J. D. et al., "BALANCED PHASE MATCHING IN SEGMENTED KTiOPO$_4$ WAVEGUIDES", *Applied Physics Letters* 56 (18), Apr. 30, 1990, pp. 1725–1727 and Jerphagnon J. et al., "MAKER FRINGES: A DETAILED COMPARISON OF THEORY AND EXPERIMENT FOR ISOTROPIC AND UNIAXIAL CRYSTALS", *Journal of Applied Physics*, Vol 41, No. 4, Mar. 15, 1970, pp. 1667–1681.

Polymeric films offer processing advantages and indeed increased fabrication options over inorganic materials. Such polymers have been used for example, to fabricate a copolymeric nonlinear optical media having a crystallographic molecular alignment in the film plane and a net dipolar molecular orientation normal to the film plane as and would be useful, for example, in a spatial light modulator. See U.S. Pat. No.: 4,957,655 to Khanarian et al. likewise, poled polymer films have been laminated to polyimide films and used as patch sensors to test integrated circuit substrates. See, e.g. Nagatsuma, T. et al. "ORGANIC PATCH SENSOR FOR ELECTRO-OPTIC MEASUREMENT OF ELECTRICAL SIGNALS AND INTEGRATED CIRCUITS", *Electronics Letters*, 27, 1932 (1991). So also, Shocraw et al. report on recent experiments which measure the effects of the photo-induced generation and transport of charge on the refractive index of polymeric films having a second order nonlinear response period. Two approaches were taken to observe such effects. In the first, the photoconductor and light refractive processes were separated by confining these functions to separate layers in a multi-layer structure. In the second, photo conduction and refractive functions were combined in the same layer. The modulation of the refractive index was then measured in response to photo conduction. Proceedings SPIE-International Society of Optical Engineering (U.S.A., Vol. 626, 1992) pp. 2–8.

SUMMARY OF INVENTION

There is disclosed in accordance with the present invention a method of preparing a multilayer polymeric nonlinear optical element by way of providing a plurality of poled polymeric film members followed by securing said poled polymeric film members in facing relationship where the plurality of poled polymeric film members are capable of optical communication between layers so defined. Preferably, the poled polymeric film members are laminated together.

Generally speaking, the poled film members each have a thickness of from about 1 to about 100 microns. Typically, the poled film members each have a thickness of from about 3 to about 25 microns and more preferably, the poled film members each have a thickness of from about 4 to about 10 microns.

The optical elements produced in accordance with the invention may have an overall thickness of from about 10 to about 10,000 microns in the general case; an overall thickness of from about 50 to about 500 microns being more typical.

The polymer films utilized with the present invention may be of the guest-host type; however thermoplastic polymer having a recurring monomeric unit corresponding to the formula:

where P is a polymer main chain unit, S is a flexible spacer group having a linear chain length of about 2-20 atoms, and M is a pendant group which exhibits second order nonlinear susceptibility are in general more suitable. Acrylates are particularly preferred.

Once fabricated, the films are poled in an electric field at elevated temperature, at least at about the glass transition temperature of the film. This may be accomplished between electrodes in an ordinary atmosphere at relatively low voltage or by way of corona poling. The films may be poled in a direction substantially perpendicular to their surfaces by way of application of an electric field along a direction substantially perpendicular to their surfaces or poled in a direction angularly offset from the perpendicular to their surfaces.

In a particularly preferred embodiment, thickness of each of the film layers corresponds to a coherence length of light defined by the equation:

$$L_c = \frac{\Pi}{\Delta K}$$

where $L_c$ is the coherence length of light propogating through the structure and $\Delta K$ is the difference in propagation constants between light of pre-determined wavelengths. Generally speaking, the thickness of each layer corresponds to a coherence length of light of selected wavelengths in the range of from about 100 to about 2500 nanometers.

The foregoing equation is of a general nature; one of skill in the art will readily appreciate the special cases of parametric amplification and frequency doubling. With respect to parametric amplification, the term $\Delta K$ is equal to $K(\omega_p) - K(\omega_s) - K(\omega)$, K being the propogation constant and wherein $\omega_p$ is the pump frequency, $\omega_s$ is the signal frequency and $\omega$ the idler frequency as described in U.S. Pat. No. 5,064,265. On the other hand, with respect to frequency doubling, the term $\Delta K$ of Equation I may be written: $K_{(2\omega 1)} - 2K_{(\omega 1)}$ where K is the propogation constant, and $\omega_1$ is the fundamental requency. See U.S. Pat. No. 4,856,406. A particularly preferred embodiment is where adjacent layers in the multilayer structure of the invention have their induced polarity or $\chi^2$ suceptiblities in opposite direction. Such geometry achieves the benefits associated with reversing polarity described in U.S. Pat. No. 4,971,416.

BRIEF DESCRIPTION OF DRAWINGS

The invention is described hereinafter with reference to the various figures wherein.

DETAILED DESCRIPTION

The invention is described in detail below for purposes of illustration only and not by way of limitation.

Multilayer devices in accordance with the present invention are fabricated utilizing polymeric films exhibiting substantial nonlinear optical susceptibility. Typically, preferred polymers are of the type described in U.S. Pat. Nos. 5,044,725; 4,822,865 and 4,801,675 having as a component the recurring unit:

where P is a main chain repeating unit, S is a flexible spacer group having 2-20 carbon atoms and M is a chromophore moiety, usually of the conjugated aromatic type. Typical examples are 50/50 copolymers of methyl methacrylate and 4(N-methacryloxyalkyloxy)-4'-nitrostilbene where N is an integer corresponding to the particular alkyl group selected such as (a) Copolymers of methyl methacrylate and 4-(6-methacryloxyhexyloxy)-4' nitrostilbene or (b) Copolymers of methyl methacrylate and 4-(3-methacryloxypropyloxy)-4' nitrostilbene or (c) Copolymers of methyl methacrylate and 4-(N-methacryloxyethyl-N-methyl)-4' nitrostilbene.

Preferably, such films are isotropic as opposed to thermotropic.

Example I

Fabrication of Free-Standing Poled Polymer Film

A 10/90 molar ratio copolymer of 4-(4-methacryloxybutoxy)-4'-nitrostilbene and methylmethacrylate was prepared having a molecular weight of 720,000. This molecular weight enables the formation of tough films and has an absorption maximum ($\lambda$ max) at 0.37 microns wavelength such that it will be transparent at 0.532 microns wavelength (the first harmonic) when the fundamental frequency of light incident on the device is 1.06 microns.

This material is estimated to have a second order nonlinear susceptibility of 1 picometer per volt and to have a coherence length for light of 1.06 $\mu$m wavelength of 6.6 microns ($L_c$) eq. 1. Thus, for a multilayer through-the-plane optical device with an angle of incidence of 50° (hereinafter described) one would fabricate films of 5.7 microns in order for the film thickness to correspond to the desired coherence length.

Such films were fabricated as follows: a conducting silicon wafer was coated with a thin layer of water soluble polymer, poly(acrylic acid) and then dried for 30 minutes at 100° C. The 10/90 NLO copolymer was then spun coated and dried atop the water soluble layer. The sample was electroded and poled at a temperature of 110° C. in a field of 70 V/micron. After the upper electrode was etched off, small squares were cut into the film using an LPX 100 Excimer laser ($\lambda$=193 $\mu$m). The wafer was then placed under water for several hours until the poly(acrylic acid) dissolved and the square pieces floated to the surface of the bath.

EXAMPLE II-V

Figure 1:
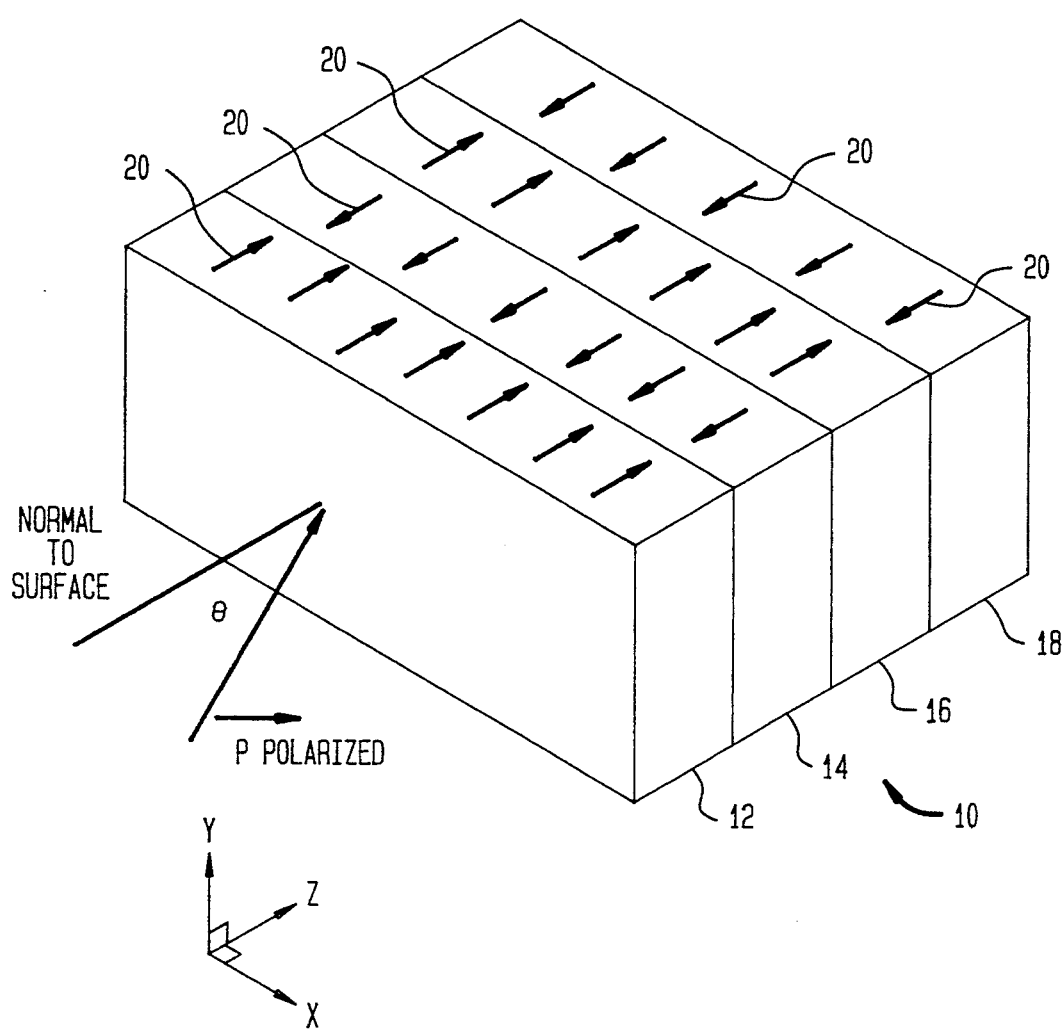
FIG. 1 is an illustration of an optical element fabricated in accordance with the present invention.

The square films of Example I were placed on a glass slide on top of one another, making certain that the poled direction was alternately reversed so that each layer had a polarity opposite the adjacent layer. The general structure is shown in FIG. 1. In FIG. 1 there is depicted schematically a multilayer optical element 10 including a plurality of layers 12, 14, 16, 18 each having a thickness of 5.7 microns. The films 12-18 are secured to one another so that their poling directions, and hence their molecular orientation are alternately reversed as shown by arrows 20. The NLO polymer films are hydrophobic so that most of the water rolls off when the films are picked up off the bath of Example I. After a stack of films was prepared on a glass slide as referred to in this example, another glass slide was placed on top and the structure was placed in an oven at 30° C. for 3 hours while pressing lightly. This ensured that the remaining water present was driven off and the film layers were laminated or fused together. Samples were prepared as follows:

| Example | No. of Layers, N |
| --- | --- |
| II | 5 |
| III | 10 |
| IV | 14 |
| V | 52 | while for a reference value, a monolayer structure (Example VI) was fabricated. Structures such as those shown in FIG. 1 may be placed in an optical cavity if so desired.

Figure 2:
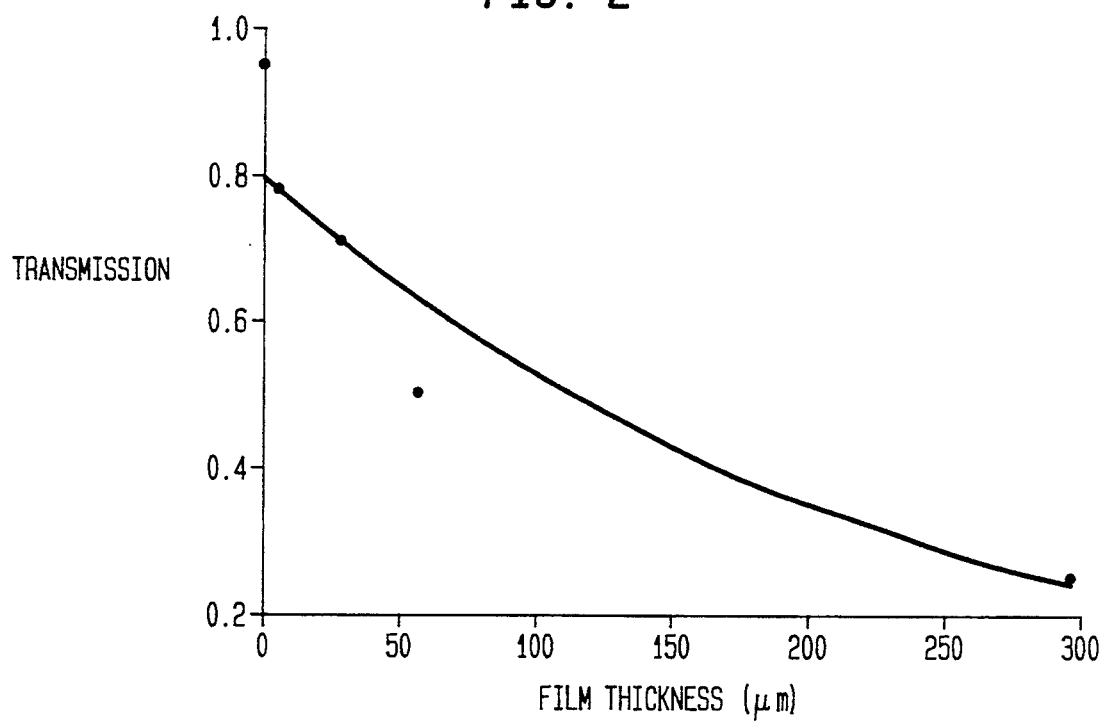
FIG. 2 is a plot of transmission versus element thickness.

Transmission levels through the samples was measured with the U.V./VIS spectrometer and found to be constant from 530 nm to 1200 nm implying that optical loss was not due to Raleigh scattering. FIG. 2 is a plot of transmission versus overall element thickness. The data was fitted to an equation of the form $I/I_0 = e^{-\alpha_\omega L}$ with an effective absorption coefficient $\alpha^\omega = \alpha^{2\omega} = 0.0041$ $\mu m^{-1}$. One sees that the fit is not very good especially for thin layers, implying that there may be still a residual thin layer of air or poly (acrylic acid) between the polymer films. If that is the case, then one should use more complicated expressions derived for propagation through periodic layered media to analyze the transmission data. A Q switched Nd. Yag laser (1.06 $\mu m$, p polarized) was focussed on the polymer film with a lens (f=1000 mm) and SHG detected with a photomultiplier tube and a fast oscilloscope. The sample was placed on a rotation stage and SHG recorded as a function of angle, where the angle from the normal to the surface, $\theta$ is shown on FIG. 1 and the light incident on element 10 is polarized as shown by vector p.

Figure 3:
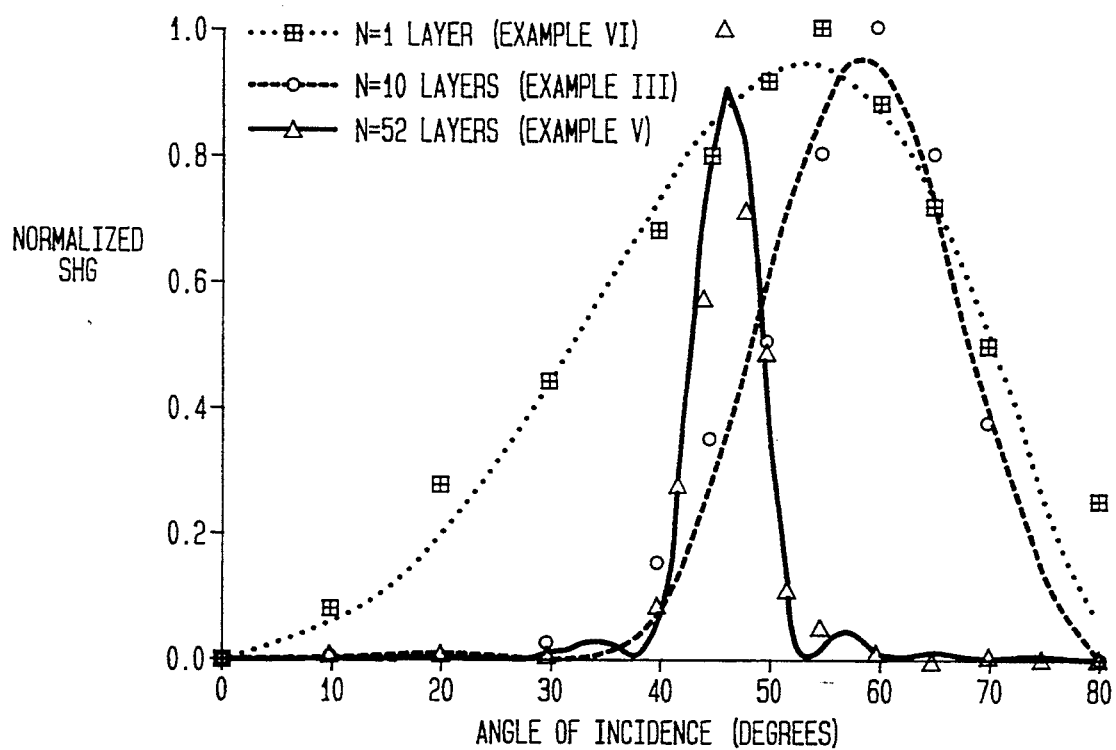
FIG. 3 is a plot of second harmonic generation vs. angle of incidence for elements of various thickness.

FIG. 3 shows the angular dependence of normalized SHG for N=1, 10 and 54 layers. N=1 sample shows the characteristic broad angular dependence with a maximum near 50 degrees. There is no SHG at normal incidence because of the symmetry properties of poled films. N=52 shows a very narrow angular dependence characteristic of a phase matched process. The phase matching length is obtained by fitting the angular dependence of SHG signal $P^{2\omega}$ to equation 2 below when the fundamental radiation $P^\omega$ and harmonic $P^{2\omega}$ are p polarized.

$$P^{2\omega} = \frac{128\pi^5 (2/\pi)^2 (\chi^2)^2 (P^\omega)^2 L^2 e^{-(\kappa_\omega + \alpha 2\omega 2)L}}{(n^\omega)^2 n^{2\omega} \lambda^2 cA} t^\omega(\theta)^4 T^{2\omega}(\theta) p(\theta)^2 \text{sinc}^2(\Delta K'(\theta)L/2) \quad (2)$$

$$t^\omega = \frac{2\cos\theta}{(n^\omega \cos\theta + \cos\theta^\omega)},$$

$$T^{2\omega} = \frac{2n^{2\omega}\cos\theta^{2\omega}(n^\omega\cos\theta + \cos\theta^\omega)(n^{2\omega}\cos\theta^\omega + n^\omega\cos\theta^{2\omega})}{(n^{2\omega}\cos\theta^{2\omega} + \cos\theta)^3}$$

$$p(\theta) = \frac{2}{3\cos}\theta^\omega \sin\theta^\omega \cos\theta^{2\omega} + \sin\theta^{2\omega}\left[\frac{1}{3}(\cos\theta^\omega)^2 + (\sin\theta^\omega)^2\right]$$

Figure 4:
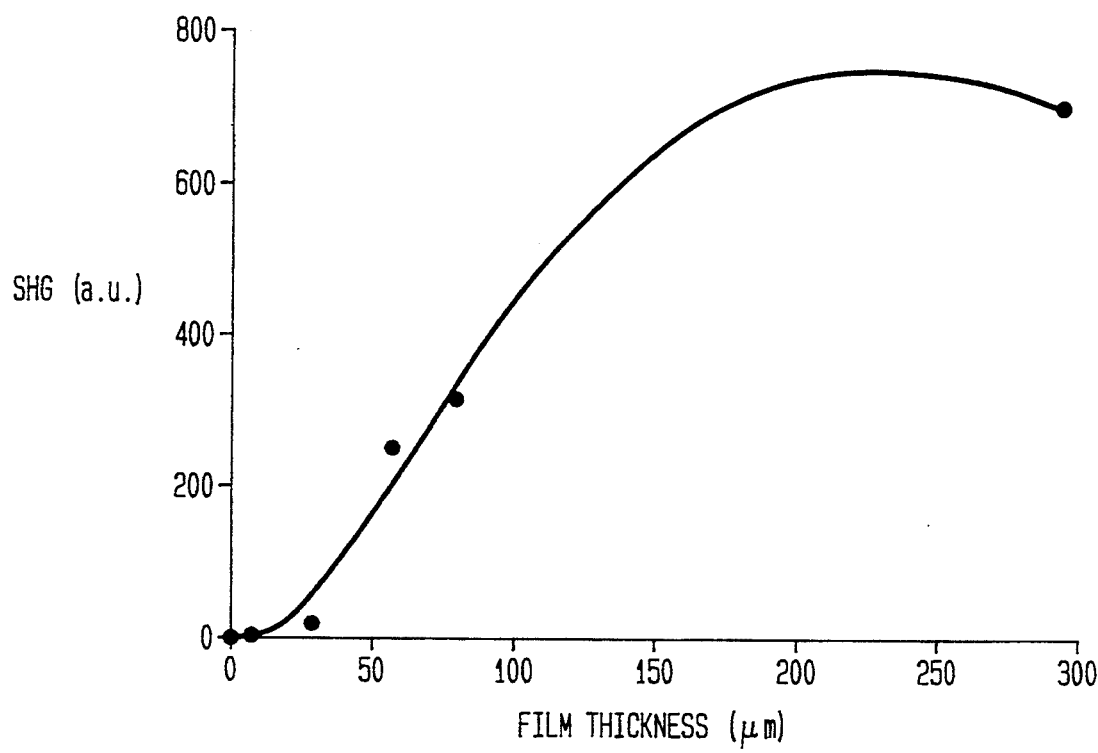
FIG. 4 is a plot of second harmonic generation (arbitrary units) versus element thickness.

In equation 2 $P^\omega$ is the incident power focused to an area A, $\alpha^{\omega,2\omega}$ are the absorption coefficients at the fundamental and harmonic wavelengths, respectively, sinc denotes the function sinx/x and c is the speed of light. $\Delta K'(\theta) = \Delta K(\theta) - \Delta K(\theta_m)$ is the mismatch in K vectors between the fundamental and harmonic waves, and the periodic grating, respectively at the phase matching angle $\theta_m$. $p(\theta)$ is the projection of the diagonal and off diagonal susceptibilities onto the p polarized optical fields. The overall SHG power is reduced by a factor of $(2/\pi)^2$ because of quasi phase matching. Equation 2 is an approximation and applies when $(\alpha_\omega - \alpha_{2\omega}/2)L < 1$. From the fit of equation 2 to the data in FIG. 3 we find a phase matching length L=54 $\mu m$ for N=10 layers and L=284 $\mu m$ for N=52 layers respectively. FIG. 4 shows the dependence of the maximum SHG (at phase matching angle) on the number of layers and thickness of the periodic stack. It does not increase as $L^2$ because of absorption. By fitting equation 2 we find that $\alpha^\omega + \alpha^{2\omega}/2 = 0.0087$ $\mu m^{-1}$. Independent measurements of the linear absorption (see FIG. 2) gave a value for the sum of absorption of 0.0068 $\mu m^{-1}$, which is in fair agreement with the values obtained from the SHG data.

For frequency doubling, one can use polymers which have larger $\chi^2$ and exhibit transparency at shorter wavelengths. The process of making large area films is achieved by using conventional plastic film technology, corona poling for example and stretching in a continuous process. The large area sheets are laminated in a separate process and cut into the required shapes.

EXAMPLE VI

Figure 5:
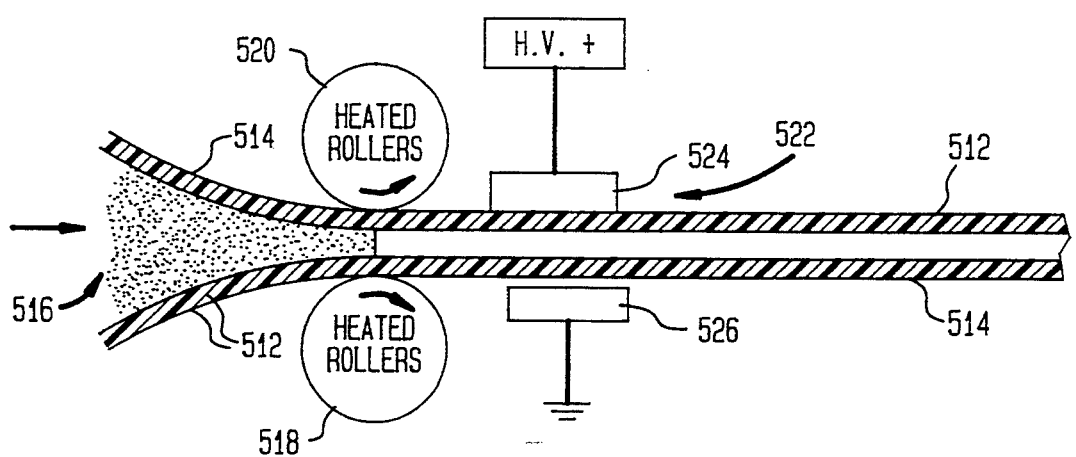
FIG. 5 is a diagram showing the continuous manufacture of films useful in connection with the present invention.

This example relates to a continuous process for preparing a poled polymer NLO film useful for forming laminates in accordance with the present invention. There is shown in FIG. 5 a schematic diagram illustrating a continuous process forming uniformly poled films in accordance with the invention. A polymer powder of the class described above is placed between two sheets 512, 514 of a non-stick polymer (PTFE for example) at 516. The multilayer composite so formed is passed between heated rollers 518, 520 which compress the composite and heat it up to at least about its glass transition temperature so that it may be poled at 522 to introduce the desired non-centrosymmetric structure by way of high voltage electrode 524 and ground electrode 526. The non-stick PTFE (polytetrafluoroethylene) layer may be peeled off after pressing and the poled film cut into squares and formed into optical elements as described in connection with examples II–VI.

The poling process may be carried out as described above, or corona poling conditions may be used if so desired. Instead of using a single NLO polymer layer, it is also possible to coextrude a multilayer structure as described in U.S. Pat. No. 3,565,985 to Schrenk et al. and then process the multilayer film as described in connection with FIG. 5. A particularly useful embodiment is to extrude a multilayer film wherein adjacent layers are formed of materials which exhibit $\chi^2$ susceptibilities of opposite sign. For example, a layer formed of a quinodimethane polymer adjacent a film of a oxynitrostilbene polymer will have an opposite $\chi^2$ value when both are poled in the same direction. In this way fabrication of multilayer structures may be simplified when it is desired to have adjacent layers of opposite $\chi^2$ values which is typically the case in connection with frequency doubling, for example.

The advantages of continuous film processing are further illustrated in connection with FIG. 6 which is a diagram illustrating an alternate geometry.

EXAMPLE VII

Figure 6:
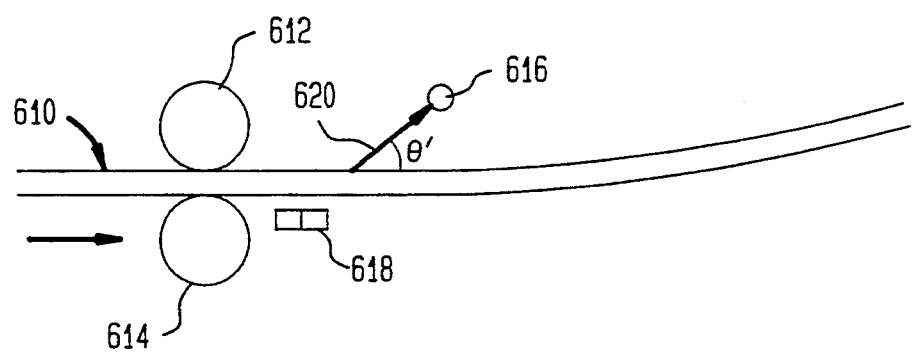
FIG. 6 is a first alternate apparatus for the continuous manufacture of films.

Referring to FIG. 6, there is illustrated a jacketed polymer film 610 passing between two heated rollers 612, 614 which heat film 610 to at least about its glass transition temperature of the film slightly more then about 100° C. for a methacrylate (oxynitrostilbene) polymer of the class described herein (Examples II–VII). There is provided a corona wire 616 and a ground plate 618 which define therebetween an electric field along a direction shown by arrow 620. As shown, the electric field forms an angle $\theta$ with the plane of film 610 such that the poling direction (the direction of the electric field) is angularly offset with respect to a normal to the plane of the film. The film, which is thus provided with a poling direction offset from the normal to the film plane, may then be processed into a multilayer structure. In such cases, it it not necessary to offset the incident light from the normal in order to achieve $\chi^2$ interaction with the optical element.

EXAMPLE VIII

Figure 7:
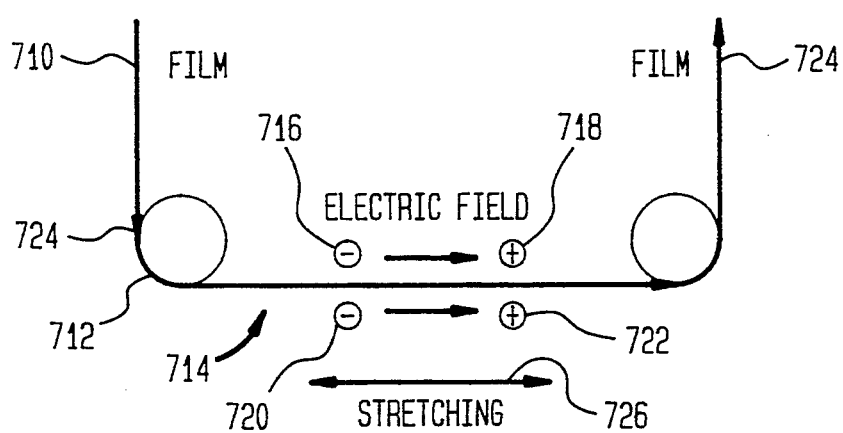
FIG. 7 is a second alternate apparatus for the continuous manufacture of films.

Referring to FIG. 7, there is illustrated a film 710 of the class described herein, contracting a heated roller 712. There is shown at 714 upper electrodes 716, 718 and lower electrodes 720 and 722. The apparatus schematically shown here may be used to produce poled film as described hereafter. As the film advances along the direction indicated by arrows 724 it is heated to about its glass transition temperature by roller 712 and poled in a direction parallel to its surface by the electrodes, while being stretched, if so desired as indicated at 726. Here again, a film is produced with a poled direction offset from the normal to the film surface.

Numerous variations and alternate embodiments of the present invention will be readily apparent to those of skill in the art. Such modifications and alternate embodiments are within the spirit and scope of the present invention which is defined in the appended claims.

We claim:

1. A method of preparing a multilayer polymeric nonlinear optical element comprising providing a plurality of poled polymeric film members followed by securing said poled polymeric film members in facing relationship wherein said plurality of poled polymeric film members are capable of optical communication between layers so defined.

2. The method according to claim 1, wherein said plurality of poled polymeric film members are laminated together.

3. The method according to claim 1, wherein said plurality of poled film members each have a thickness of from about 1 to about 100 microns.

4. The method according to claim 1, wherein said plurality of poled film members each have a thickness of from about 3 to about 25 microns.

5. The method according to claim 1, wherein said plurality of poled film members each have a thickness of from about 4 to about 10 microns.

6. The method according to claim 1, wherein said polymer nonlinear optical element has an overall thickness of from about 10 to about 10000 microns.

7. The method according to claim 1, wherein said polymer nonlinear optical element has an overall thickness of from about 50 to about 500 microns.

8. The method according to claim 1, wherein said poled polymeric film members each comprise a thermoplastic polymer having a recurring monomeric unit corresponding to the formula:

where P is a polymer main chain unit, S is a flexible spacer group having a linear chain length of about 2–20 atoms, and M is a pendant group which exhibits second order nonlinear susceptibility.

9. The method according to claim 8, wherein said polymer main chain unit includes the residue of an acrylic monomer.

10. The method according to claim 1, wherein said poled polymeric film members are each poled in an electric field at elevated temperature, at least at about the glass transition temperature of the film.

11. The method according to claim 10, wherein said poled polymeric film members are each poled by way of corona poling.

12. The method according to claim 1, wherein said poled polymeric film members are each poled in a direction substantially perpendicular to their major surfaces by way of application of an electric field along a direction substantially perpendicular to their major surfaces.

13. The method according to claim 1, wherein said poled polymeric film members are each poled in a direction angularly offset from the perpendicular to their major surfaces.

14. A multilayer optical element comprising in combination a plurality of nonlinear polymer optical film layers secured in facing relationship each poled in an electric field prior to being secured in facing relationship and wherein said plurality of layers defines a periodic nonlinear optical medium.

15. The multilayer optical element according to claim 14, wherein the thickness of each of said film layers corresponds to a coherence length of light defined by the equation:

$$L_c = \frac{\Pi}{\Delta K}$$

where $L_c$ is the coherence length and $\Delta K$ is the difference in propagation constants between light of selected wavelengths.

16. The multilayer optical element according to claim 15, wherein the thickness of each layer corresponds to a coherence length of light of selected wavelengths in the range of from about 100 to about 2500 nanometers.

17. The multilayer optical element according to claim 15, wherein said film layers are each poled in a direction perpendicular to their major surface.

18. The multilayer optical element according to claim 15, wherein at least two layers are disposed to exhibit $\chi^2$ susceptibility of opposite sign from each other.

19. The multilayer optical element according to claim 15, wherein at least two adjacent layers are disposed and arranged so that their poled molecular orientation is opposite from each other.

20. The multilayer optical element according to claim 14 wherein said optical element has an overall thickness of from about 50 microns to about 500 microns.

* * * * *